United States Patent
Chiesa et al.

(10) Patent No.: US 7,529,489 B2
(45) Date of Patent: May 5, 2009

(54) RECONFIGURABLE MULTIPLE PORT TRANSPONDER

(75) Inventors: Luca Della Chiesa, Concorezzo (IT); Giuseppe Pietro Ravasio, Bergamo (IT); Mauro Rudi Casanova, Milan (IT); Giacomo Losio, Tortona (IT)

(73) Assignee: Cisco Technology, Inc., San Jose, CA (US)

( * ) Notice: Subject to any disclaimer, the term of this patent is extended or adjusted under 35 U.S.C. 154(b) by 598 days.

(21) Appl. No.: 11/162,744

(22) Filed: Sep. 21, 2005

(65) Prior Publication Data

US 2007/0065152 A1    Mar. 22, 2007

(51) Int. Cl.
*H04B 10/00* (2006.01)
(52) U.S. Cl. .................................... 398/138; 398/139
(58) Field of Classification Search ................. 398/135, 398/138
See application file for complete search history.

(56) References Cited

U.S. PATENT DOCUMENTS

| | | | |
|---|---|---|---|
| 2003/0016411 A1 | 1/2003 | Zhou et al. | |
| 2003/0031404 A1 | 2/2003 | Pedersen | |
| 2004/0057724 A1* | 3/2004 | Oksanen et al. | 398/5 |
| 2005/0175341 A1 | 8/2005 | Ovadia | |
| 2006/0133804 A1* | 6/2006 | Boduch et al. | 398/5 |
| 2007/0031153 A1* | 2/2007 | Aronson et al. | 398/138 |
| 2008/0063407 A1* | 3/2008 | Singh et al. | 398/140 |

* cited by examiner

*Primary Examiner*—Nathan M Curs

(57) ABSTRACT

A transponder unit which relays signals between a plurality of channels of an optical transport network and a plurality of clients. The interconnections within the transponder unit are reconfigurable for selective connections. A connection between a first client and a first network channel and a connection between a second client and a second network channel is independent of each other and may be selected so that the second client is connected to the first network channel and the first client is connected to the second network channel. Other selected connections are also possible.

10 Claims, 4 Drawing Sheets

US 7,529,489 B2

RECONFIGURABLE MULTIPLE PORT TRANSPONDER

BACKGROUND OF THE INVENTION

The present invention is related to optical networks and, more particularly, to optical transponders for such networks.

Transponders are transceiver (transmitter/receiver) devices which receive signals from a source and retransmit the signals to a destination to operate as relays. As described herein, the transponders provide the interfaces between WDM optical transport networks, such as metropolitan area networks (MANs) and wide area networks (WANs), and clients, such as local area networks (LANs) and storage area networks (SANs). It should be noted that these networks are exemplary only and should not be considered limiting. Furthermore, the term, WDM (wavelength division multiplexing), is used inclusively as to include DWDM (dense WDM) and other optical networks where wavelength is used to define the communication channels.

Heretofore, a transponder unit mapped a single client interface to a single optical network channel interface. With many different client and network protocols, such as (in increasing bit transfer rates) DS-1/E1, DS-3/E3, 10/100Base-T, OC-3/STM-1 to OC-12/STM-4, Gigabit Ethernet, OC-48/STM-16, OC-192/STM-64, and 10 Gigabit Ethernet network protocols, some transponders units were capable of adapting to several protocols. Such flexibility avoided the need for separate transponder units for each protocol combination and lowered network costs.

Nonetheless, a transponder unit provides only a mapping for one client interface and one network channel interface. It would seem beneficial if a transponder unit could provide a mapping for multiple client and network channel interfaces. Furthermore, it would be beneficial if the mapping could be reconfigurable. The present invention provides for such a transponder unit.

DESCRIPTION OF SPECIFIC EMBODIMENTS

Figure 1A:
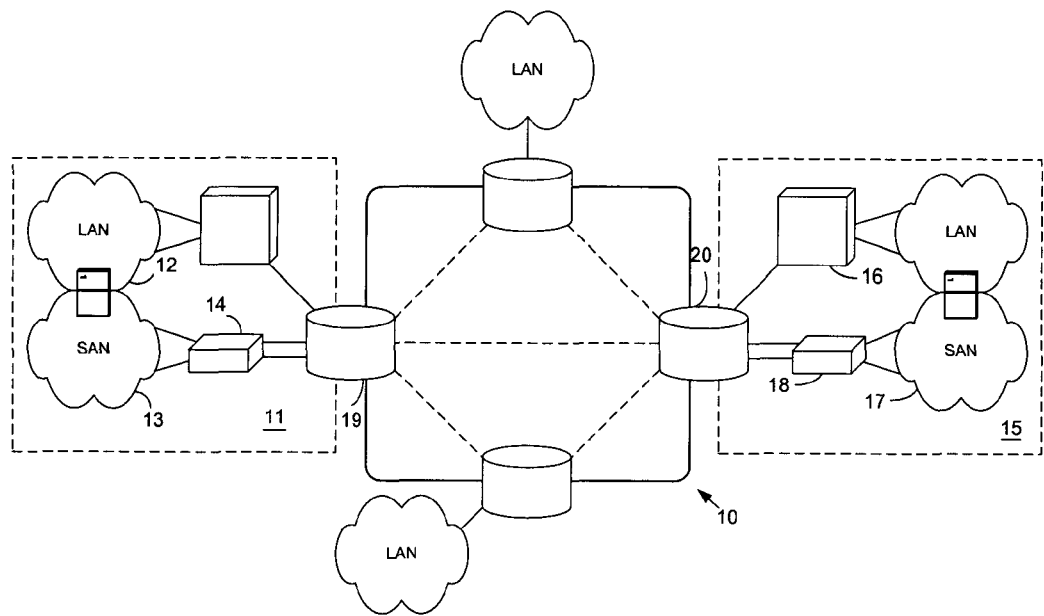
FIG. 1A is a representational diagram showing an SONET/SDH transport network connecting different network systems, including LANs and SANs.
Figure 1B:
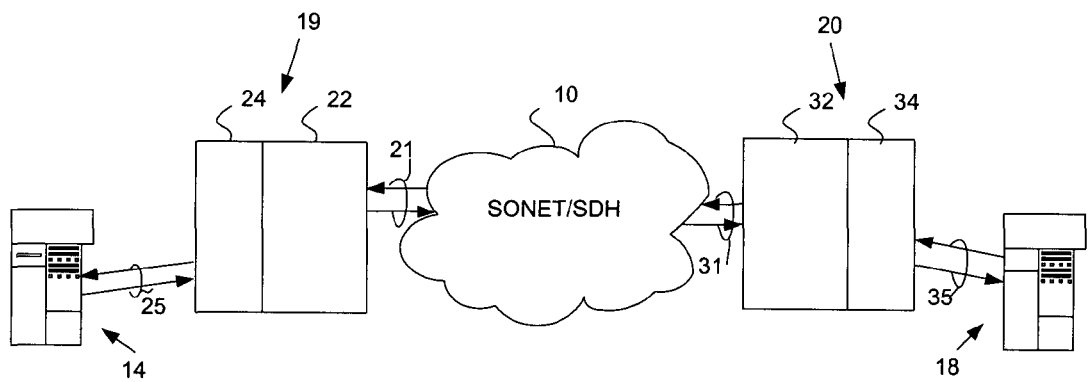
FIG. 1B is a more detailed diagram illustrating the connection of two SANs across the SONET/SDH transport network.

FIGS. 1A and 1B show an exemplary network in which the present invention might operate. The network has a primary data center 11 with a local area network (LAN) 12 and interconnected Storage Area Network (SAN) 13 connected to a backup data center 15 with its local area network (LAN) 16 and interconnected Storage Area Network (SAN) 17 over a SONET/SDH transport network 10, in this case, an OC-48 (Optical Carrier-48) ring. The SONET/SDH transport network is also connected to other local area networks. The Storage Area Networks operate under Fibre Channel or FICON protocol (or other protocols) and Fibre Channel/FICON switches 14 and 18 operate as a Fibre Channel/FICON ports and are connected to different transport interfaces 19 and 20 respectively for the transport of Fibre Channel/FICON data frames over the SONET/SDH transport network 10 between the two data centers 11 and 15. In this manner, the Storage Area Network 13 is extended to the Storage Area Network 17, and vice versa.

Transponders might be located in the transport interfaces 19 and 20. In this example, the clients can be considered to be Fibre Channel/FICON ports, the Fibre Channel/FICON switches 14 and 18, and the transport network channel to be one of the wavelength channels of the SONET/SDH transport network 10. FIG. 1B illustrates in greater detail the connection of the Fibre Channel/FICON ports (and Fibre Channel/FICON networks) over the SONET/SDH network 10, and the location and general operation of transponders in the exemplary and simplified network. The transponders in the transport interfaces 19 and 20 are connected to the Fibre Channel/FICON ports 14 and 18 respectively. The ports 14 and 18 are associated with the FIG. 1 Storage Area Networks 13 and 17, which can include disk drive arrays, RAIDs, disk farms, or possibly other Fibre Channel/FICON elements, such as routers, switches, or other Fibre Channel/FICON network elements.

The transport interfaces 19 and 20 are formed, in part, by optical transport platforms 22 and 32, such as ONS 15454 (available from Cisco Systems, Inc. of San Jose, Calif.), and transponder units 24 and 34 which help provide the interfaces between the Fibre Channel/FICON elements/networks and the SONET/SDH network 10. The transponder unit 24 is adapted to fit into the optical transport platform 22 and the transponder unit 32 is adapted to fit into the optical transport platform 32. Through the transponder units 24 and 34, and the platforms 22 and 32 respectively, the Fibre Channel/FICON ports 14 and 18 are interconnected across the SONET/SDH network transport path. The result is that there are two virtual wires for the connection between the Fibre Channel/FICON port 14 at one end of the SONET/SDH network 10 and the Fibre Channel/FICON port 18 at the other end.

Figure 2:
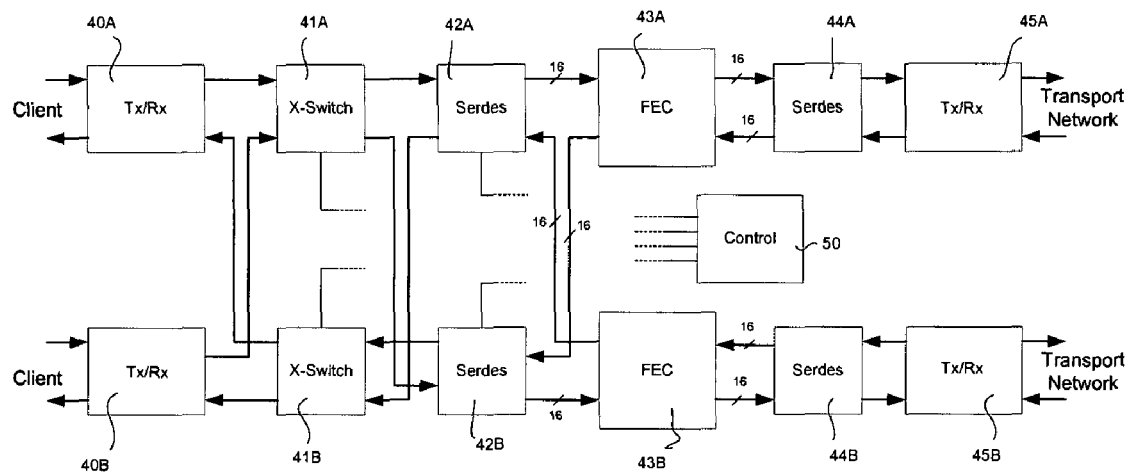
FIG. 2 is a diagram of the organization of a transponder unit, according to one embodiment of the present invention.

FIG. 2 illustrates a transponder unit in accordance with an embodiment of the present invention, which might be used in the previously described network. The transponder unit, which can be realized in the form of a printed circuit board, has two sets of interconnected transceiver (Tx/Rx), serializer/deserializer (Serdes), forward error correction (FEC), and cross-switch (X-Switch) elements in the form of integrated circuits. One set of connected elements has a transceiver (Tx/Rx) 40A, a cross-switch (X-Switch) 41A, serializer/deserializer (Serdes) 42A, forward error correction (FEC) element 43A, a second serializer/deserializer 44A and a second transceiver 45A; the second set of connected elements has a transceiver 40B, a cross-switch 41B, serializer/deserializer 42B, forward error correction element 43B, a second serializer/deserializer 44B and a second transceiver 45B. The transceivers 40A and 40B are integrated fiber optic transceivers for the client side of the transponder unit. They receive from, and send to, a client port high speed optical signals at a selected wavelength, i.e., a WDM channel. In this particular embodiment, an XFP interface, an industry standard for a pluggable optical interface for 10 Gigabit SONET/SDH, Fibre Channel, Gigabit Ethernet, and other applications, is used for all the Tx/Rxs 40A, 40B, 45A and 45B. The Tx/Rxs 40A and 40B translate the received serial optical signals into retimed serial electrical signals and, in the opposite direction, the Tx/Rxs 40A and 40B translate serial electrical signals into retimed serial optical signals for transmission to the client ports. The Tx/Rxs 45A and 45B operate similarly with respect to the optical signals of the transport network and the electrical signals of the transponder unit.

The cross-switches (X-Switch) 41A and 41B have two input and two output terminals and operate in three possible modes: 1) signals at each input terminal are sent across to its corresponding output terminal; 2) signals at each input terminal are sent to the output terminal of the other input terminal (a cross-connection); and 3) signals at one input terminal are sent to both output terminals (the signals at the other input terminal are blocked) and, in the opposite direction, signals at a selected one of the two output (now input) terminals are sent to the input (now output) terminal. Crosspoint switch Model No. SY58023U from Micrel, Inc. of San Jose, Calif. have been found suitable for these operations in the described transponder unit. The operation of the cross-switches 41A and 41B with respect to the operation of the transponder unit as a whole is discussed in detail below.

The serializer/deserializers (Serdes) 42A, 42B, 44A and 44B take the serial signals from the transceivers 40A, 40B (and 45A, 45B) and convert them into parallel signals for the forward error correction elements (FECs) 43A and 43B, or convert parallel signals from the FEC 43A and 43B into serial signals for the transceivers 40A, 40B (and 45A, 45B). In this particular embodiment, the parallel signals are carried on 16-bit wide buses. Integrated circuits, such as Part No. BCM8152C from Broadcom Corporation of Irvine, Calif. and Part No. S19235/19237 from Applied Micro Circuits Corporation of San Diego, Calif., may be used for the Serdes elements.

The forward error correction (FEC) elements 43A and 43B encode the signals for transmission over the transport network and decodes the signals received from the transport network. If the transport network is an SONET/SDH network, such as the network 10 of FIGS. 1A and 1B, then typically a Reed-Solomon code, part of the ITU-T standards G. 975 and G. 709, is used. Of course, other codes may also be used for SONET/SDH networks and other optical networks. FEC framer integrated circuits from Applied Micro Circuits Corporation, Intel Corporation of Santa Clara, Calif., and Vitesse Semiconductor Corporation from Camarillo, Calif. are suitable for the FEC elements. These devices implement standard Reed-Solomon code and proprietary algorithms for enhanced FEC, or EFEC, to boost coding gain.

The signal paths of the transponder unit are illustrated by the arrows in FIG. 2. The Tx/Rxs 45A and 45B, which are each connected to the transport network and communicate over particular channels, are also connected to the Serdes 44A and 44B respectively by input and output terminals. Likewise, the Serdes 44A and 44B are respectively connected to the FECs 43A and 43B by 16 parallel input and output lines. On the other hand, the 16 input lines to the Serdes 42B from output terminals of the FEC 43A and the 16 input lines to Serdes 42A from output terminals of the FEC 43B are cross-connected. The 16 output lines from the Serdes 42A to input terminals of the FEC 43A and the 16 input lines to input terminals of the FEC 43B from the Serdes 42B form a straight connection. The serial output terminals of the Serdes 42A and 42B are connected to input terminals of the cross-switch 41B; and the output terminals of the cross-switch 41A is connected to serial input terminals of the Serdes 42A and 42B respectively. Between the cross-switches 41A, 41B and the Tx/Rxs 40A, 40B, the output terminals of the cross-switch 41B is connected to internal (to the transponder unit) input terminals of the Tx/Rxs 40A, 40B respectively, and internal output terminals of the Tx/Rxs 40A and 40B are connected to input terminals of the cross-switch 41A. Of course, the Tx/Rxs 40A and 40B are also externally (with respect to the transponder unit) connected to client ports.

The cross-connections between the first set of elements, i.e., the Tx/Rx 40A, cross-switch 41A, Serdes 42A, FEC 43A, Serdes 44A and Tx/Rx 40A, and the second set of elements, i.e., the Tx/Rx 40B, cross-switch 41B, Serdes 42B, FEC 43B, Serdes 44B and Tx/Rx 40B, create useful reconfigurable signal paths in the transponder unit. Signals over control lines represented by solid and dotted lines in FIG. 2 from a control block 50 to the cross-switches 41A, 41B and the Serdes 42A, 42B set the signal path routing. In passing, it should be noted that the control block 50 also sends control signals to the Serdes and FEC elements for the data rate and FEC functions. The control block 50 may be set in various ways, such as software programming, including set bits in a register, or by setting manual switches on the printed circuit board of the transponder unit.

In accordance with the present invention, the transponder has multiple ports or, more precisely, multiple port connections or interfaces. The transponder is reconfigurable so that different port interfaces may be connected to each other. In the operation mode illustrated logically in FIG. 3A, signals are routed so that the client Tx/Rx 40A is connected to the transport network Tx/Rx 45A and the client Tx/Rx 40B to the transport network Tx/Rx 45B. In the Tx/Rx 40A-to-Tx/Rx 45A signal routing, serial optical signals from a client connected to the Tx/Rx 40A are received and changed into retimed serial electrical signals. The cross-switch 41A sends the electrical signals to the serializer/deserializer 42A where the serial signals are changed into parallel configuration and sent to the forward error correction element 43A. Here, the FEC 43A encodes the signals according to the requirements of the transport network and passes the encoded signals to the serializer/deserializer 44A where the signals are rearranged back into a serial stream. The Tx/Rx 45A changes this stream of electrical signals into a stream of optical signals for transmission across the transport network. In the opposite direction, serial optical signals from the transport network are received and changed into retimed serial electrical signals by the Tx/Rx 45A. The serializer/deserializer 44A rearranges the serial stream into a parallel stream and passes the parallel signals to the FEC 43A which decodes the signals encoded according to the requirements of the transport network. From the element 43A the now-decoded parallel signals are passed to the serializer/deserializer 42B which changes the parallel signals back to serial signals. The cross-switch 41B receives these electrical signals and sends the signals to the Tx/Rx 40A which changes this stream of electrical signals into a stream of optical signals for transmission to the client port.

In the Tx/Rx 40B-to-Tx/Rx 45B signal routing, serial optical signals from a client connected to the Tx/Rx 40B are received and changed into retimed serial electrical signals which are sent to the cross-switch 41A, which in turn sends the electrical signals to the serializer/deserializer 42B. The serial signals are changed into parallel configuration and sent to the FEC element 43B. The FEC 43B encodes the signals according to the requirements of the transport network and passes the encoded signals to the serializer/deserializer 44B where the signals are rearranged back into a serial stream for the Tx/Rx 45B which changes this stream of electrical signals into a stream of optical signals for transmission across the transport network. In the opposite direction, the Tx/Rx 45B receives serial optical signals from the transport network and changes them into retimed serial electrical signals for the Serdes 44B which rearranges the serial stream into a parallel stream and passes the parallel signals to the FEC 43B. The FEC 43B decodes the signals encoded according to the requirements of the transport network and passes the now-decoded parallel signals are passed to the Serdes 42A which changes the parallel signals back to serial signals. The cross-switch 41B receives these electrical signals and sends the signals to the Tx/Rx 40B which changes this stream of electrical signals into a stream of optical signals for transmission to the client port.

With the signal routing described above and represented in FIG. 3A, the signal paths between the Tx/Rxs 40A, 45A and between the Tx/Rxs 40B,45B are effectively two independent transponders. The opposite datapaths of each of the Serdes elements 42A, 42B, 44A and 44B, and the FEC elements 43A, 43B can operate independently of each other so that the two effective transponders in the transponder unit can operate at different data rates, and with Forward Error Correction (FEC), or with enhanced FEC (EFEC), or without FEC. The sole constraint upon the two effective transponders is that the data rate in each direction of an effective transponder must be the same since the transmit and receive data rates of each of the Tx/Rxs 40A, 40B, 45A and 45B are required to be the same.

Figure 3A:
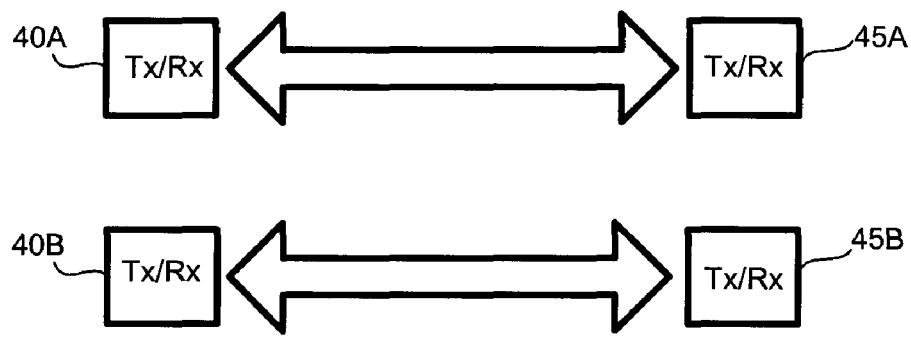
FIG. 3A is a representational diagram of data flows in the FIG. 2 transponder unit configured so that data flows independently between two client interfaces and two transport network interfaces.
Figure 3B:
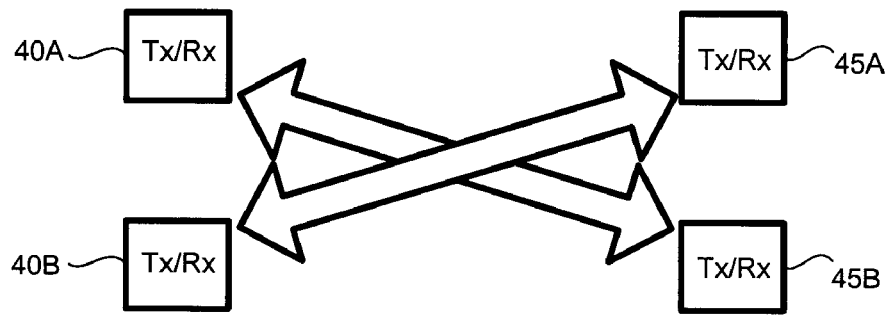
FIG. 3B is a representational diagram in which the independent data flows of FIG. 3A have been switched between the two client interfaces and two transport network interfaces.

By reconfiguring the cross-switches 41A and 41B in the transponder unit, the signals are cross-routed for effectively two independent transponders in the transponder unit, as shown in FIG. 3B. The signal paths connect the Tx/Rxs 40A and 45B, and the Tx/Rxs 40B and 45A. In the Tx/Rx 40A-to-Tx/Rx 45B signal routing, serial optical signals from the client connected to the Tx/Rx 40A are received and changed into retimed serial electrical signals for the cross-switch 41A which sends the electrical signals to the Serdes 42B where the serial signals are changed into parallel configuration and sent to the FEC element 43B. After encoding the signals according to the requirements of the transport network, the FEC 43B and passes the encoded signals to the Serdes 44B where the signals are rearranged back into a serial stream. The Tx/Rx 45B changes this stream of electrical signals into a stream of optical signals for transmission across the transport network. In the opposite direction, the Tx/Rx 45B receives serial optical signals from the transport network and converts them into retimed serial electrical signals. The Serdes 44B rearranges the serial stream into a parallel stream and passes the parallel signals to the FEC 43B which decodes the signals encoded according to the requirements of the transport network. From the element 43B the now-decoded parallel signals are passed to the Serdes 42A which changes the parallel signals back to serial signals. The cross-switch 41B receives these electrical signals and sends the signals to the Tx/Rx 40A which changes this stream of electrical signals into a stream of optical signals for transmission to the client port.

In the Tx/Rx 40B-to-Tx/Rx 45A signal routing, serial optical signals from the client connected to the Tx/Rx 40B are received and changed into retimed serial electrical signals which are sent to the cross-switch 41A, which in turn sends the electrical signals to the Serdes 42A. The serial signals are changed into parallel configuration and sent to the FEC element 43A. The FEC 43A encodes the signals according to the requirements of the transport network and passes the encoded signals to the Serdes 44A where the signals are rearranged back into a serial stream for the Tx/Rx 45A. The Tx/Rx 45A changes this stream of electrical signals into a stream of optical signals for transmission across the transport network. In the opposite direction, the Tx/Rx 45A receives serial optical signals from the transport network and changes them into retimed serial electrical signals for the Serdes 44A which rearranges the serial stream into a parallel stream and passes the parallel signals to the FEC 43A. The FEC 43A decodes the signals encoded according to the requirements of the transport network and passes the now-decoded parallel signals are passed to the Serdes 42B which changes the parallel signals back to serial signals. The cross-switch 41B receives these electrical signals and sends the signals to the Tx/Rx 40B which changes this stream of electrical signals into a stream of optical signals for transmission to the client port.

It should be noted that the first two modes of operation illustrated in FIGS. 3A and 3B allow the transponder unit to facilitate protection of both the client-transponder unit terminal interface and the transponder units. Two client-transponder unit interfaces operate 1+1 automatic protection switching/multiplex section protection (APS/MSP) switching with one transponder unit. Switching is managed between the two client-transponder unit interfaces. Thus instead of two transponder units as done previously, the present invention permits one transponder unit to economically and conveniently to carry out 1+1 switching protection.

If the transponder unit interfaces are connected to separate clients, each client and line is unprotected. The client signals are sent through the unprotected transponder unit. This configuration is suitable for transporting the client payloads over a DWDM network that is protected by unidirectional-path switch ring/subnetwork connection protection (UPSR/SNCP) or bidirectional line switched ring/multiplex section shared protection ring (BLSR/MS-SPR) protocols, which run the transport network 10 in FIGS. 1A and 1B. Where two transponder units handled the separate clients previously, a single transponder unit can handles both clients, according to the present invention.

Figure 3C:
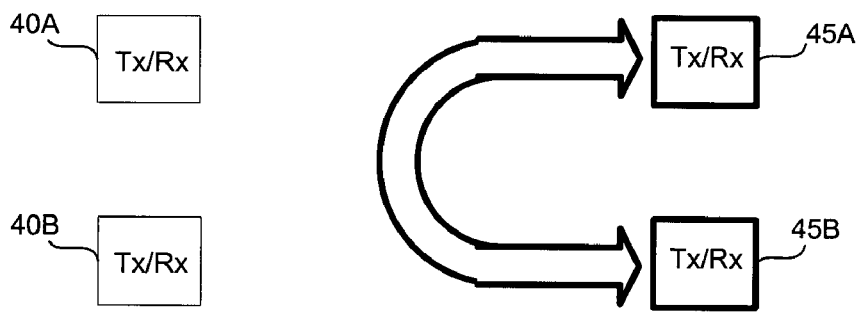
FIG. 3C is a representational diagram of the FIG. 2 transponder unit configured so that data flows between two transport network interfaces.

In a third mode of operation illustrated by FIG. 3C, the cross-switches 41A and 41B are not used in setting up the signal paths, but rather the Serdes 42A and 42B are set so that signals entering a Serdes 42A (42B) from an FEC element 43B (43A) are sent back to the other FEC 43A (43B). See the data paths of FIG. 2 transponder unit. Signals from the transport network are returned back to the transport network after passing through both FECs 43A and 43B for enhanced Forward Error Correction (EFEC), i.e., the transponder unit is set so as to relay signals along the transport network with additional data protection measures, EFEC.

Figure 3D:
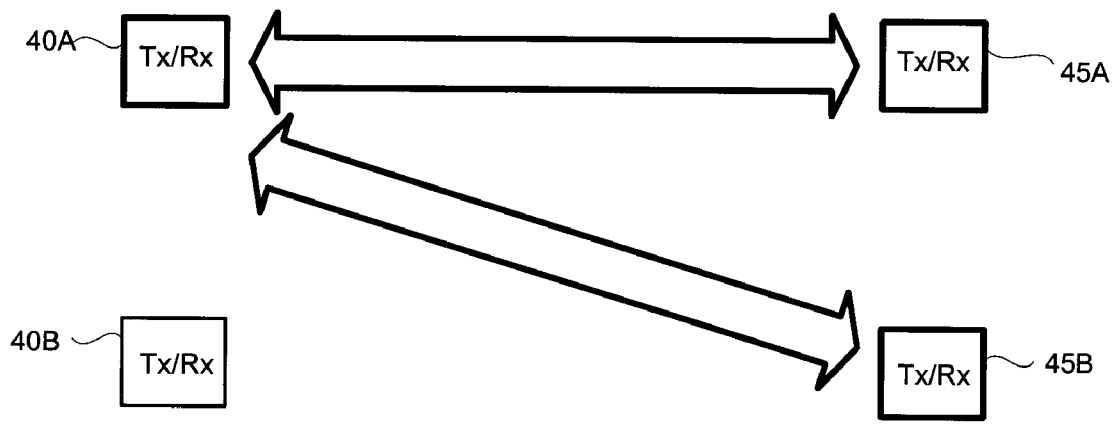
FIG. 3D is a representational diagram of the FIG. 2 transponder unit configured for data flows for one client interface and two transport network interfaces for a protected mode operation.

FIG. 3D shows a fourth mode of operation for the transponder unit according to the present invention. In this protected mode two sets of identical client signals are sent over the transport network. When received from the transport network, one set of signals is passed on to the designated client and the other set is monitored for errors and failures. In this example, the client signal received by the Tx/Rx 40A is sent by the cross-switch 41A to both Serdes 42A and 42B. From the Serdes 42A, one set of transport network-bound signals travels through the FEC element 43A, Serdes 44A and the Tx/Rx 45A. Likewise, from the Serdes 42B the second set of transport network-bound signals travels through the FEC element 43B, Serdes 44B and the Tx/Rx 45B. In the opposite direction, two sets of signals from the transport network are received by Tx/Rxs 45A and 45B. One set received by the Tx/Rx 45B travels through the Serdes 44B, FEC element 43B, Serdes 42A and the cross-switch 41B which sends the signals to the Tx/Rx 45A and the client. The second set received by the Tx/Rx 45A travels through the Serdes 44A, FEC element 43A, Serdes 42B and to the cross-switch 41B where the signals are blocked and monitored. Of course, the operations of the crosspoint switches 41A and 41B can be reversed so that a client connection is made through the Tx/Rx 40B and the Tx/Rx 40A blocks incoming signals.

This mode permits Y-Cable Configuration protection which provides transponder unit protection without the client-transponder unit interface protection. A single client interface is split to two transponder unit Tx/Rxs using a Y-protection device. Again, where previously two transponder units were connected to the client (through the Y-protection device), the present invention allows only a single transponder unit to be used.

Figure 4:
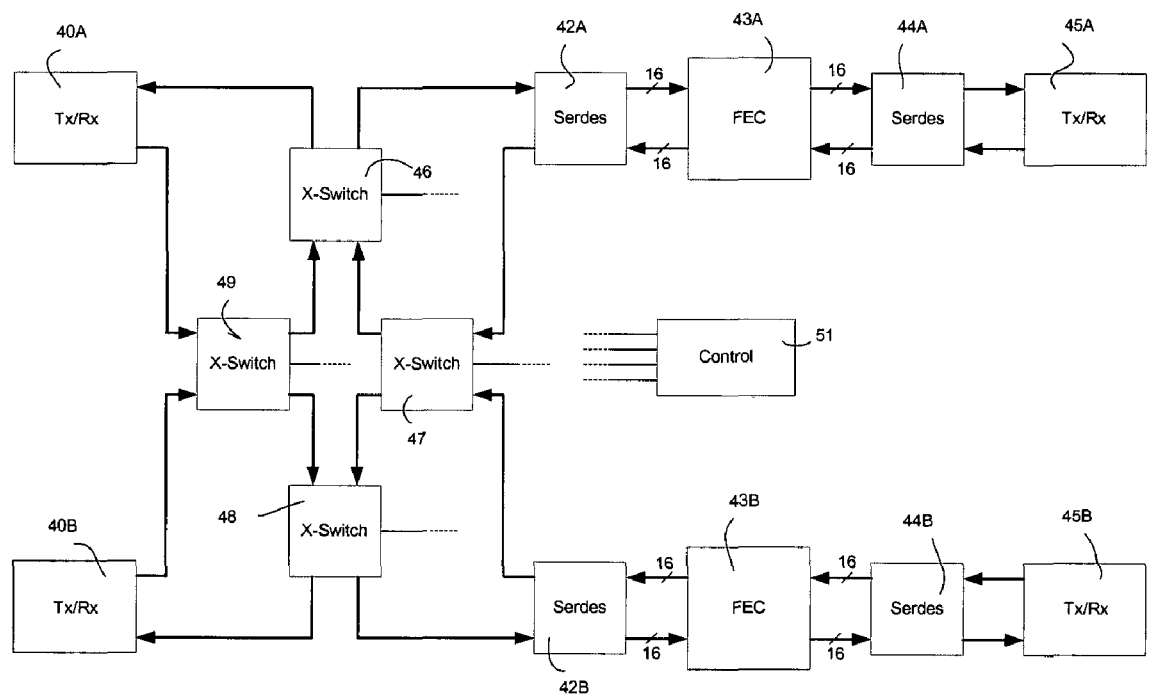
FIG. 4 is a diagram of the organization of another transponder unit, according to the present invention.

FIG. 4 illustrates the organization of another transponder unit, according to the present invention. The elements found in the FIG. 2 transponder unit are the same in the FIG. 4 transponder unit, but the number of the cross-switches and the connection arrangement of cross-switches, Serdes and FECs are different. The FECs 43A and 43B are connected to the Serdes 42A and 42B respectively, which are connected to four cross-switches 46-49. The cross-switch 47 has input terminals connected to the Serdes 42A and 42B and output terminals connected to one input terminal of the cross-switch 46 and one input terminal of the cross-switch 48. The cross-switch 46 has a second input terminal connected to an output terminal of the fourth cross-switch 49, and one of its output terminals connected to the Serdes 42A and its second output terminal connected to the Tx/Rx 40A. Symmetrically, the cross-switch 48 has a second input terminal connected to an output terminal of the fourth cross-switch 49, and one of its output terminals connected to the Serdes 42B and its second output terminal connected to the second Tx/Rx 40B. The fourth cross-switch 49 has one of its two input terminals connected to the Tx/Rx 40A; the other input terminal is connected to the Tx/Rx 40B. Control signals from a control block 51 reconfigure the connections of the cross-switches 46-49. With this arrangement, the reconfigurable connections for the four modes of transponder operation described previously are handled by the four cross-switches 46-49.

The advantages of the transponder unit of FIG. 2 compared to the FIG. 4 transponder unit include a lower part count, i.e., only two cross-switches are required, rather than four. Not so readily evident is the reduced amount of noise, jitter, has been found to be generated by the FIG. 2 transponder unit.

Thus the present invention provides a transponder unit which can effectively provide for multiple transponders operating independently of each other. A plurality of client ports and transport network ports can be reconfigurably connected, the transport network ports can be connected to each other, and the data for a client port can be sent and received over two transport network ports for a protection mode operation.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A transponder unit connected to an optical transport network, comprising
    a first client transceiver, a first cross-switch, a first serializer/deserializer, a first forward error correction element, a second serializer/deserializer and a first network transceiver forming a first set of interconnected elements;
    a second client transceiver, a second cross-switch, a third serializer/deserializer, a second forward error correction element, a fourth serializer/deserializer and a second network transceiver forming a second set of interconnected elements;
    said first set and said second set further having cross-connections wherein said first client transceiver has an input terminal connected to a first output terminal of said second cross-switch and an output terminal connected to a first input terminal of said first cross-switch; said second client transceiver has an input terminal connected to a second output terminal of said second cross-switch and an output terminal connected to a second input terminal of said first cross-switch; said first cross-switch has a first output terminal connected to a serial input terminal of said first serializer/deserializer and a second output terminal connected to a serial input terminal of said second serializer/deserializer; said second cross-switch has a first input terminal connected to a serial output terminal of said first serializer/deserializer and a second input terminal connected to a serial output terminal of said second serializer/deserializer; said first serializer/deserializer has parallel output terminals connected to first input terminals to said first forward error correction element and parallel input terminals connected to first output terminals of said second forward error correction element; said second serializer/deserializer has parallel input terminals connected to first output terminals of said first forward error correction element and parallel output terminals connected to first input terminals to said second forward error correction element;
    whereby first and second clients may be each independently and selectably connected to said optical transport network by said transponder unit.

2. The transponder unit of claim 1 wherein said first client transceiver and said first network transceiver are connected and said second client transceiver and said second network transceiver are connected in a first selected mode, and said first client transceiver and said second network transceiver are connected and said second client transceiver and a first network transceiver are connected in a second selected mode.

3. The transponder unit of claim 2 wherein said first network transceiver and said second network transceiver are connected in a third selected mode.

4. The transponder unit of claim 3 wherein said signals between said first network transceiver and said second network transceiver pass through two of said forward error correction elements for enhanced Forward Error Correction.

5. The transponder unit of claim 2 wherein said first client transceiver is connected to said first and second network transceivers in a fourth selected mode so that data from said first client transceiver is sent across said optical transport network by said first and second network transceivers, and said first client transceiver receives from a selected one of said first and second network transceivers data received across said optical transport network by said first and second network transceivers.

6. A transponder unit connected to an optical transport network, comprising
    a first client transceiver, a first serializer/deserializer, a first forward error correction element, a second serializer/deserializer and a first network transceiver forming a first set of interconnected elements;
    a set of a second client transceiver, a third serializer/deserializer, a second forward error correction element, a fourth serializer/deserializer and a second network transceiver forming a second set of interconnected elements; and first, second, third and fourth cross-switches forming part of said first set of interconnected elements, part of second set of interconnected elements and a cross-connection between said first and second sets wherein said first cross-switch has a first output terminal connected to an input terminal of said first client transceiver and a second output terminal connected to a serial input terminal of said first serializer/deserializer; said second cross-switch has a first output terminal connected to an input terminal of said second client transceiver and a second output terminal connected to a serial input terminal of said third serializer/deserializer; said third cross-switch has a first input terminal connected to an output terminal of said first client transceiver, a second input terminal connected to an output terminal of said second client transceiver, a first output terminal connected to a first input terminal of said first cross-switch and a second output terminal connected to a first input terminal of said second cross-switch; said fourth cross-switch has a first input terminal connected to a serial output terminal of said first serializer/deserializer, a second input terminal connected to a serial output terminal of said third serializer/deserializer, a first output terminal connected to a second input terminal of said first cross-switch and a second output terminal connected to a second input terminal of said second cross-switch;

whereby first and second clients may be each independently and selectably connected to said optical transport network by said transponder unit.

7. The transponder unit of claim 6 wherein said first client transceiver and said first network transceiver are connected and said second client transceiver and said second network transceiver are connected in a first selected mode, and said first client transceiver and said second network transceiver are connected and said second client transceiver and a first network transceiver are connected in a second selected mode.

8. The transponder unit of claim 7 wherein said first network transceiver and said second network transceiver are connected in a third selected mode.

9. The transponder unit of claim 8 wherein said signals between said first network transceiver and said second network transceiver pass through two of said forward error correction elements for enhanced Forward Error Correction.

10. The transponder unit of claim 7 wherein said first client transceiver is connected to said first and second network transceivers in a fourth selected mode so that data from said first client transceiver is sent across said optical transport network by said first and second network transceivers, and said first client transceiver receives from a selected one of said first and second network transceivers data received across said optical transport network by said first and second network transceivers.

* * * * *